United States Patent Office 3,084,190
Patented Apr. 2, 1963

3,084,190
RECOVERY OF HEXAMETHYLPHOSPHORIC-
TRIAMIDE
James K. Miller and John N. Lomonte, Lake Jackson, Tex., assignors to The Dow Chemical Company, Midland, Mich., a corporation of Delaware
No Drawing. Filed June 16, 1960, Ser. No. 36,469
7 Claims. (Cl. 260—551)

This invention pertains to an improved process for the recovery of hexamethylphosphorictriamide from a reaction mixture resulting from the reaction of phosphorus oxyhalide with dimethylamine in an organic solvent.

Generally hexamethylphosphorictriamide is prepared by the reaction of phosphorus oxychloride or phosphorus oxybromide with dimethylamine in an organic solvent in which the dimethylamine hydrohalide is insoluble. The reaction product obtained in the organic solvent contains hexamethylphosphorictriamide, dimethylamine and dimethylamine hydrohalide. The dimethylamine hydrohalide being insoluble in the organic solvent is separated from the reaction mixture by filtration and the like. After the dimethylamine hydrohalide is removed from the reaction product, the hexamethylphosphorictriamide is recovered by means of distillation.

In following this method of recovering the hexamethylphosphorictriamide, a number of disadvantages are encountered. Not only is the filtration of the dimethylamine hydrohalide difficult due to its fineness, the reaction product mixture is corrosive and thus special type of equipment must be used if the product is to be free of contamination. In addition to this, generally the dimethylamine hydrohalide has a small but significant solubility in the organic solvent used as diluent so that upon distillation the dimethylamine hydrohalide salt remaining in the solvent reacts with the product to form tars.

It has been suggested that the reaction mixture be reacted with a stoichiometric quantity of 10 N sodium hydroxide to decompose and neutralize the dimethylamine hydrohalide in the reaction mixture prior to distillation. After the dimethylamine hydrohalide is neutralized, the dimethylamine is distilled off. The water formed by the neutralization and added with the sodium hydroxide is subsequently removed by azeotropic distillation. The conditions are then adjusted to distill off and recover the diluent. The remaining undistilled product is then transferred to a smaller still and distilled under vacuum to obtain the desired hexamethylphosphorictriamide. The sodium chloride formed by the neutralization of the dimethylamine hydrohalide remains in the bottom of the still as a solid cake.

While the above process may be readily carried out on a laboratory scale, it is difficult and inconvenient to carry out the complex distillation on a large scale. In addition to the operational difficulties, subjecting the desired product to the relatively high temperatures, in the presence of the sodium chloride and water, for the length of time required to complete the distillation results in decomposition of the product and thus decreases the yield.

It is therefore an object of this invention to provide a simple method for the recovery of the hexamethylphosphorictriamide from a reaction mixture resulting from the preparation of methylphosphorictriamide by the reaction of phosphorus oxyhalide with dimethylamine in an organic solvent. A further object is to provide a process which will be free of the disadvantages pointed out above.

According to the invention, the above and other objects are attained by contacting the reaction mixture obtained by the reaction of phosphorus oxyhalide with dimethylamine in an organic solvent with a solution of an alkali metal hydroxide, such as sodium hydroxide, potassium hydroxide, and lithium hydroxide, to neutralize the dimethylamine hydrochloride. Upon neutralization the mixture is distilled to remove the dimethylamine and the remaining portion of the reaction mixture is contacted a second time with an aqueous alkali metal hydroxide solution. A heterogeneous mixture is obtained containing an organic phase and an aqueous phase. The hydroxide solution used is of sufficient concentration so that the aqueous phase obtained contains from 5 to 15 weight percent of the hydroxide. In addition to the alkali metal hydroxide, the aqueous phase also contains dissolved therein the alkali metal halide resulting from the reaction of the dimethylamine hydrohalide with the hydroxide. The organic phase obtained contains the solvent, the remaining small amount of the dimethylamine which was not distilled off, and the desired hexamethylphosphorictriamide and is substantially free of the alkali metal halide and the hydroxide. By this method it is possible in a single contact stage to obtain 95 percent of the hexamethylphosphorictriamide in the organic phase and by using a multistage contact it is possible to recover all but about 0.25 percent of the product in the organic phase. Since the organic phase obtained is substantially free of the alkali metal halide and the hydroxide, the hexamethylphosphorictriamide may be readily recovered from the organic phase by distillation at the higher temperatures normally required without decomposition.

While in preparation of hexamethylphosphorictriamide, a phosphorus oxyhalide of a halogen having an atomic number in the range of 17 to 35 may be employed, phosphorus oxychloride is preferably used. Generally, the phosphorus oxychloride and the dimethylamine are reacted at a temperature in the range of from 80° to 90° C. The reaction of phosphorus oxychloride with the amine is quite violent and thus the reaction is carried out in an organic diluent with one reagent being added gradually. A diluent which has a boiling point or a boiling point range between about 65° C. to 220° C. is generally used. The diluent or solvent must be a mobile liquid at room temperature and be stable at its boiling point. It must be a solvent for phosphorus oxyhalide and dimethylamine as well as for the product. Since the diluents generally used in the above reaction also have a low solubility in water, these known diluents may be used in the preparation of the reaction product from which the hexamethylphosphorictriamide is to be extracted according to the invention. Illustrative examples of some of the solvents commonly used are aromatics and substituted aromatics, such as xylene, benzene, ethyl benzene and ethers having a boiling point between 65° and 220° C., such as dibutyl ether and n-propyl ether.

To recover the hexamethylphosphorictriamide from the reaction product, it is not necessary to first neutralize the reaction product and then add the alkali hydroxide to carry out the extraction. If desired, sufficient amount of the hydroxide solution for the neutralization and extraction may be added in one step. A heterogeneous mixture is obtained containing an organic phase and an aqueous phase excepting that considerable proportions of the diethylamine will remain in the aqueous phase. Generally when the one step process is used, the mixture after addition of the hydroxide is subjected to distillation to remove the dimethylamine from both phases. After the dimethylamine has been removed, the mixture is at an elevated temperature which is preferred for the extraction step. The two phases are then separated. If desired, the phases may be separated before the dimethylamine is distilled off, but this will require the distillation of both of the phases in two separate distillations to recover the dimethylamine.

The concentration of the alkali metal hydroxide solution used is critical. To obtain the proper extraction of the alkali metal halide and water from the organic phase without dissolving an excessive amount of the solvent and the hexamethylphosphorictriamide, the concentration of the hydroxide in the liquid phase in equilibrium with the organic phase must contain from 5 to 15 weight percent of the alkali metal hydroxide, preferably 10 to 15 weight percent. Thus, when an alkali solution is contacted in one step with the reaction mixture without having the dimethylamine hydrohalide neutralized first, a solution of sufficient concentration must be used so that, after the neutralization of the dimethylamine hydrohalide, the resulting aqueous solution obtained is within the desired concentration. If the concentration of the alkali metal hydroxide in the aqueous phase is below 5 weight percent, a substantial portion of the hexamethylphosphorictriamide is dissolved in the aqueous phase. When the concentration is above 15 percent three phases are obtained which are undesirable, since additional separation problems are encountered.

Although temperatures as low as 20° C. may be used in the extraction, high temperatures tend to shift the equilibrium to improve the separation of the constituents between the phases. Temperatures from 60° to the boiling point of the mixture are generally used. The pressure is not critical and generally the extraction is carried out at close to atmospheric pressure.

In the extraction sufficient amount of the alkali metal hydroxide solution must be used to dissolve all of the salt formed upon the neutralization of the dimethylamine hydrohalide. Generally sufficient amount of the alkali metal hydroxide is used so that the alkali metal halide concentration obtained in the aqueous phase is in the range of 1 to 18 weight percent, preferably 10 to 18 weight percent. While lithium hydroxide or potassium hydroxide may be used, sodium hydroxide is preferred due to its availability and cost.

The hexamethylphosphorictriamide obtained in the organic phase is generally recovered from the organic phase by distillation. The organic phase may contain a small amount of water generally about 2.5 weight percent or less which presents no problems in distillation. The solvent and the dimethylamine obtained upon distillation are recycled and reacted with more phosphorus oxyhalide.

To further illustrate the invention, a reaction product containing hexamethylphosphorictriamide was obtained by the reaction of 96.8 grams of phosphorus oxychloride with 201 grams of dimethylamine in 480 milliliters of the xylene. In the preparation of the hexamethylphosphorictriamide the reaction of phosphorus oxychloride and the dimethylamine was carried out at 80° to 90° C. for a period of 2 hours until substantially all of the phosphorus oxychloride had been reacted. To the reaction product, 670 ml. of a sodium hydroxide solution containing 23.6 weight percent of caustic were added.

After the addition of the caustic approximately 1375 grams of mixture was obtained which contained about 7.3 weight percent of the hexamethylphosphorictriamide, 8.3 weight percent of dimethylamine, 30.1 weight percent of xylene, 8.1 weight percent of sodium chloride, 6.1 weight percent of sodium hydroxide, 39.2 weight percent of water, and the remainder amines and other homologs of hexamethylphosphorictriamide and dimethylamine. After intermixing the caustic solution with the reaction product, the mixture was heated to remove the dimethylamine by distillation after which the two phases were separated. Upon analysis of the organic phase and the aqueous phase, it was found that 95 percent of the hexamethylphosphorictriamide remained in the organic phase, while the aqueous phase contained substantially all of the sodium hydroxide, sodium chloride, and water. The aqueous layer thus obtained was again contacted with an equal volume of xylene. Upon separating the aqueous phase from the second contact, it was found that only 0.25 percent of the original hexamethylphosphorictriamide remained in the caustic and water phase. The organic phase obtained from the first separation upon analysis was found to contain only approximately 2.5 weight percent of water with substantially no sodium hydroxide or sodium chloride.

What is claimed is:

1. In a process wherein hexamethylphosphorictriamide is prepared by the reaction of a phosphorous oxyhalide of a halogen having an atomic member in the range of 17 to 35 with dimethylamine in an organic solvent substantially insoluble in water and having a boiling point in the range of 65 to 220 degrees centigrade to obtain a reaction mixture containing hexamethylphosphorictriamide, dimethylamine, dimethylamine hydrohalide, and an organic solvent, the improvement for the recovery of the hexamethylphosphorictriamide from the reaction mixture which comprises, contacting the reaction mixture with an aqueous alkali metal hydroxide solution selected from the group consisting of sodium hydroxide, potassium hydroxide, and lithium hydroxide, at a temperature of from 20 degrees centigrade to the boiling point of the mixture thereby to react the dimethylamine hydrohalide with the alkali metal hydroxide and to obtain a heterogeneous mixture containing an organic phase and an aqueous alkali metal hydroxide phase, said reaction mixture being contacted with the aqueous alkali metal hydroxide solution in proportion such that the aqueous hydroxide phase obtained will contain from 5 to 15 percent of alkali metal hydroxide and be sufficient in amount to dissolve the alkali metal halide resulting from the reaction of the dimethylamine hydrohalide with the alkali metal hydroxide, separating the organic phase from the alkali metal hydroxide phase, and recovering the hexamethylphosphorictriamide from the organic phase.

2. A process according to claim 1 wherein the dimethylamine hydrohalide is of a halogen having an atomic number of 17.

3. A process according to claim 2 wherein the alkali metal hydroxide is sodium hydroxide.

4. A process for the recovery of hexamethylphosphorictriamide from a reaction mixture containing hexamethylphosphorictriamide, dimethylamine and dimethylamine hydrochloride resulting from the reaction of dimethylamine with phosphorus oxychloride in an organic solvent substantially insoluble in water and having a boiling point in the range of 65° to 220° C., which comprises intermixing the reaction mixture with a stoichiometric amount of an alkali metal hydroxide selected from the group consisting of sodium hydroxide, potassium hydroxide, and lithium hydroxide, to react the dimethylamine hydrochloride with the alkali metal hydroxide to obtain dimethylamine, water, and alkali metal chloride, removing the dimethylamine, contacting the neutralized mixture with sufficient aqueous solution of an alkali metal hydroxide to produce a 5 to 15 weight percent aqueous solution of an alkali metal hydroxide selected from the group cited above at a temperature in the range of 20° C. to the boiling point of the mixture, to thereby extract the alkali metal chloride and water from the neutralized mixture, and recovering the hexamethylphosphorictriamide from the substantially alkali metal chloride and water-free organic phase.

5. In a process wherein hexamethylphosphorictriamide is prepared by the reaction of phosphorus oxychloride with dimethylamine in an organic solvent substantially insoluble in water and having a boiling point in the range of 65° to 220° C. to obtain a reaction mixture containing hexamethylphosphorictriamide, dimethylamine, dimethylamine hydrochloride, and an organic solvent, the improvement for the recovery of the hexamethylphosphorictriamide from the reaction mixture, which comprises contacting the reaction mixture with an aqueous sodium hydroxide solution at a temperature in the range of 60° C. to the boiling point of the mixture to react the dimethylamine hydrochloride with the sodium hydroxide and to obtain a heterogeneous mixture containing an organic phase and an aqueous sodium hydroxide phase, said reaction mixture being contacted with the aqueous sodium hydroxide solution in proportion such that the aqueous hydroxide phase obtained will contain from 10 to 15 percent of sodium hydroxide and be sufficient to dissolve the sodium chloride resulting from the reaction of the dimethylamine hydrochloride with the sodium hydroxide, separating the organic phase from the sodium hydroxide phase, and recovering the hexamethylphosphorictriamide from the organic phase.

6. In a process wherein phosphorus oxychloride is reacted with dimethylamine in an organic solvent substantially insoluble in water and having a boiling point in the range of 65° to 220° C. to obtain a product containing hexamethylphosphorictriamide, dimethylamine, dimethylamine hydrochloride and an organic solvent and wherein the reaction mixture is contacted with a stoichiometric amount of an alkali metal hydroxide to neutralize the dimethylamine hydrochloride, the improvement in the recovery of hexamethylphosphorictriamide from the neutralized mixture which comprises removing the dimethylamine by distillation, contacting the remaining neutralized reaction mixture with an aqueous solution of an alkali metal hydroxide selected from the group consisting of sodium hydroxide, potassium hydroxide, and lithium hydroxide to extract the alkali metal chloride and water obtained as a result of the reaction of the dimethylamine hydrochloride with the alkali metal hydroxide in an aqueous phase and obtain an organic phase substantially free of the alkali metal chloride, said alkali metal hydroxide having sufficient concentration to give the aqueous phase containing from 5 to 15 weight percent of alkali metal hydroxide and less than 18 weight percent of the alkali metal chloride, separating the aqueous phase from the organic phase at from 20° C. to boiling point of the mixture, and recovering the hexamethylphosphorictriamide from the organic phase.

7. A process according to claim 6 wherein the aqueous phase contains from 10 to 15 weight percent solution of sodium hydroxide and the temperature is in the range of 60° C. to the boiling point of the solvent.

References Cited in the file of this patent
UNITED STATES PATENTS

| | | |
|---|---|---|
| 2,606,900 | Parker et al. | Aug. 12, 1952 |
| 2,662,095 | Isham | Dec. 2, 1953 |
| 2,756,252 | McKinnis | July 24, 1956 |